(12) United States Patent  
Oomori et al.

(10) Patent No.: US 6,661,148 B2
(45) Date of Patent: Dec. 9, 2003

(54) MOTOR-DRIVEN TOOL

(75) Inventors: Katsuhiro Oomori, Ibaraki (JP); Chikai Yoshimizu, Ibaraki (JP); Masanori Watanabe, Ibaraki (JP); Shinki Ohtsu, Ibaraki (JP); Takuma Saito, Ibaraki (JP); Toshiyuki Nemoto, Loveland, OH (US)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/085,627

(22) Filed: Mar. 1, 2002

(65) Prior Publication Data

US 2002/0182020 A1 Dec. 5, 2002

(30) Foreign Application Priority Data

Mar. 2, 2001 (JP) ...................... P2001-058626

(51) Int. Cl.[7] .............. H02K 7/14; H02K 5/24
(52) U.S. Cl. ............ 310/239; 310/239; 310/50; 310/71; 310/241; 310/42; 310/89
(58) Field of Search ............. 310/239, 50, 42, 310/47

(56) References Cited

U.S. PATENT DOCUMENTS

| 3,813,567 A | * | 5/1974 | Schmuck | .......... 310/50 |
| 4,562,368 A | * | 12/1985 | Weldon | .......... 310/178 |
| 5,949,173 A | * | 9/1999 | Wille | .......... 310/220 |

FOREIGN PATENT DOCUMENTS

| JP | 4-43365 | 4/1992 | |
| JP | 6-84776 | 12/1994 | |
| JP | 10-136611 | 5/1998 | |
| JP | 10136611 | * 5/1998 | ............ H02K/9/06 |

* cited by examiner

Primary Examiner—Nestor Ramirez
Assistant Examiner—Iraj A. Mohandesi
(74) Attorney, Agent, or Firm—McGinn & Gibb, PLLC

(57) ABSTRACT

In a motor-driven tool, a carbon brush part 8 is arranged between a suction port 6 and a commutator 11 of the motor and includes a cylindrical side wall 8a. The cylindrical side wall 8a located on an outer periphery of the commutator 11 is provided with a tapered portion 8b which grows wider toward the commutator 11 and grows narrower toward a coil end 10 of the armature. Between the carbon brush part 8 and the coil end 10, there is provided a heat radiating plate 4 made of metal and adapted to be engaged with the carbon brush part 8.

16 Claims, 8 Drawing Sheets

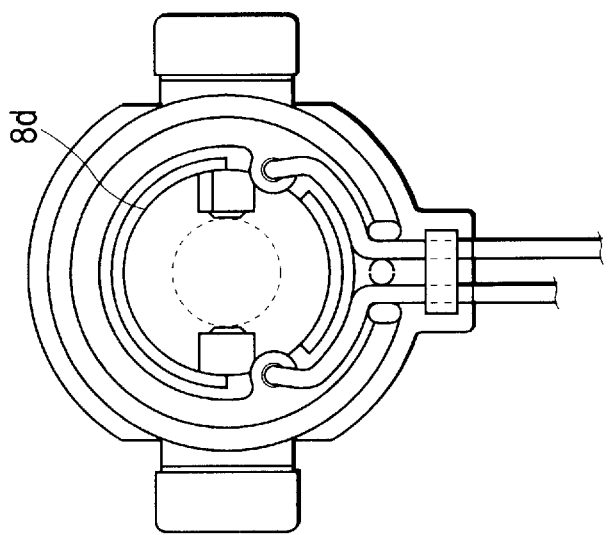
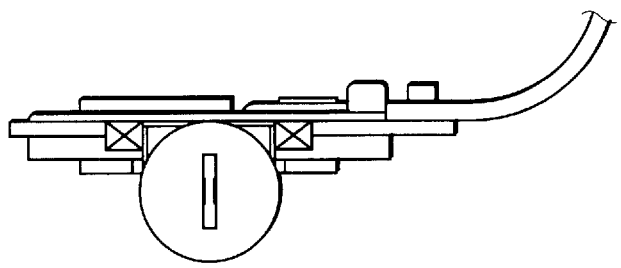
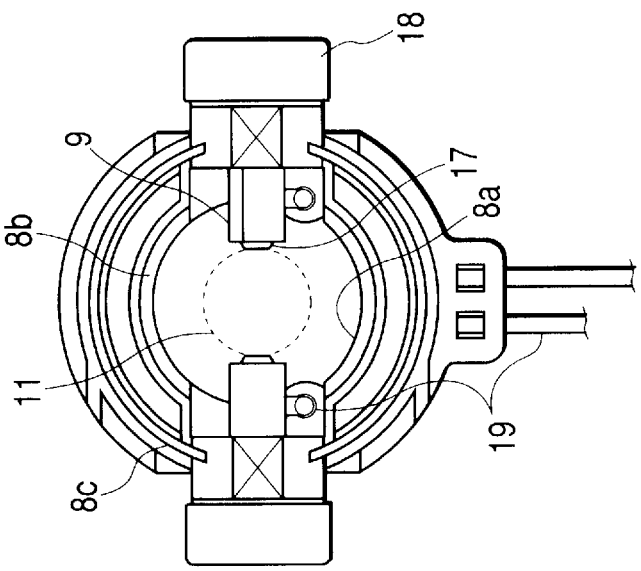

MOTOR-DRIVEN TOOL

BACKGROUND OF THE INVENTION

1. Field of the Invention

The present invention relates to a cooling air passage in a motor-driven tool having a cooling fan, such an impact driver or the like.

2. Description of the Related Art

A conventional motor-driven tool will be described referring to FIGS. 6 to 9. The conventional motor-driven tool as shown in FIGS. 6 and 7 has a substantially T-shape. In a body part composed of a housing 5 which is divided in two and constitutes a main body of the motor-driven tool (hereinafter referred to as "a housing"), there are arranged a motor which is a power source, a reduction gear mechanism, and so on, and in a handle part hanging down from the body part, there are arranged a trigger switch for supplying a power to the motor, and so on. There are also provided, in the above mentioned body part, a carbon brush block 8 for holding a carbon brush 17 which supplies a power to an armature 1 of the motor, and so on. These carbon brush block 8 and so on are clamped by the housing 5 to be held at a determined position in the housing 5. There are further formed a rib 5a in the housing 5 in order to receive and position a stator 3. Because the rib 5a supports the stator 3 at its left side face, an air entering from a suction port 21 provided in the housing 5 is blocked by the rib 5a and the stator 3, and flows along an outer peripheral wall of the stator 3 to the right in FIG. 7, as shown by an arrow B' in FIG. 7. Then, the air flows between the stator 3 and the armature 1 to the left in FIG. 7, and thereafter, will be discharged from a discharge port 7 to an exterior of the housing 5. The carbon brush block 8 consists of a carbon tube 9, a carbon cap 18, a lead wire 19 and so on. This carbon brush block 8 is arranged in such a manner that the carbon brush 17 can be attached and detached from the exterior of the housing.

At a side of the armature 1 opposite to its output side, there is provided a cooling fan 2. When this cooling fan is rotated, an air around the cooling fan 2 is discharged from the discharge port 7 provided in the housing 5, and accordingly, a negative pressure is created in the housing 5 to form a difference in pressure between an inside and an outside of the housing. As the results, airs flow into the housing through suction ports 20 and 21 provided in the housing 5. The armature 1, the carbon brush 17, the carbon tube 9 and so on are cooled by these flows of the air (the arrows B, B' in FIG. 7). The air flowing into the housing 5 from the suction port 20 is mainly used for cooling a commutator 11, the carbon brush 17, the carbon tube 9 and so on, while the air flowing into the housing 5 from the suction port 21 is mainly used for cooling the armature 1 which is a heat source.

The conventional motor-driven tool as shown in FIGS. 8 and 9 has a substantially T-shape. In a body part composed of a housing 5 constituting the main body of the motor-driven tool, there are arranged a motor which is a power source, a reduction gear mechanism, and so on, and in a handle part hanging down from the body part, there are arranged a trigger switch for supplying a power to the motor, and so on. There are also provided in the body part a carbon brush block 8 for holding a carbon brush 17 which supplies a power to an armature 1 of the motor, and so on. These carbon brush block 8 and so on are provided in a casing 22 which contains the armature 1 and a stator 3.

At a side of the armature 1 opposite to its output side, there is provided a cooling fan 2. When this cooling fan 2 is rotated, an air around the cooling fan 2 is discharged from a discharge port 7 provided in the casing 22 to an exterior of the casing 22, and accordingly, a negative pressure is created in the casing 22 to form a difference in pressure between an inside and an outside of the casing 22. As the results, airs flow into the casing 22 through suction ports 6 and 6' provided in the casing 22. The armature 1, the carbon brush 17, the carbon tube 9 and so on are cooled by these flows of the air (arrows C, C' in FIG. 9).

In the cooling structure of the motor-driven tool as shown in FIGS. 6 and 7, there has been a problem that because the air for cooling the armature (the arrow B' in FIG. 7) flows along an outer periphery of the stator, an air passage (distance) from the suction port to the armature becomes long, resulting in a serious loss of pressure and decrease of cooling efficiency, and consequently, the armature will be burnt to be broken at an earlier stage.

On the other hand, in the cooling structure of the motor-driven tool as shown in FIGS. 8 and 9, because the air for cooling the armature is not an air passage flowing along the outer periphery of the stator, the armature can be cooled by the air flow as shown by the arrow C in FIG. 9. However, there has been a problem that since the air entering into the casing from the suction port at the carbon brush side (the arrow C' in FIG. 9) flows into a large space which is formed between the casing and the carbon brush and so on, velocity of the flow will be lowered, and strong cooling air cannot be applied to the commutator, the carbon brush and the carbon tube. As the results, heat generation of the carbon brush and the carbon tube cannot be prevented, resulting in fusion of the carbon cap and so on.

SUMMARY OF THE INVENTION

It is an object of the invention to solve the above described problems and attain a long life of a motor-driven tool by reliably cooling a surrounding area of a motor, and at the same time, by decreasing a pressure loss.

The above described object will be attained by providing a motor-driven tool comprising a motor consisting of an armature and a stator, a cooling fan provided on a rotary shaft of the motor, a carbon brush part adapted to be cooled by the cooling fan, and a housing for containing the carbon brush part and the motor, the housing being provided with a suction port and a discharge port, characterized in that the carbon brush part is arranged including a cylindrical side wall between the suction port and a commutator of the motor, the cylindrical side wall located close to an outer periphery of the commutator being provided with a tapered portion which grows wider toward the commutator and grows narrower toward a coil end of the armature, and that between the carbon brush part and the coil end, there is provided a heat radiating plate made of metal and adapted to be engaged with the carbon brush part.

BRIEF DESCRIPTION OF THE DRAWINGS

FIGS. 4A to 4C show a carbon block in the motor-driven tool according to the invention, in which FIG. 4A is a front view, FIG. 4B is a side view, and FIG. 4C is a back view of the same.

FIGS. 5A and 5B show a heat radiating plate in the motor-driven tool according to the invention, in which FIG. 5A is a front view and FIG. 5B is a side view of the same.

DETAILED DESCRIPTION OF THE PREFERRED EMBODIMENTS

Figure 1:
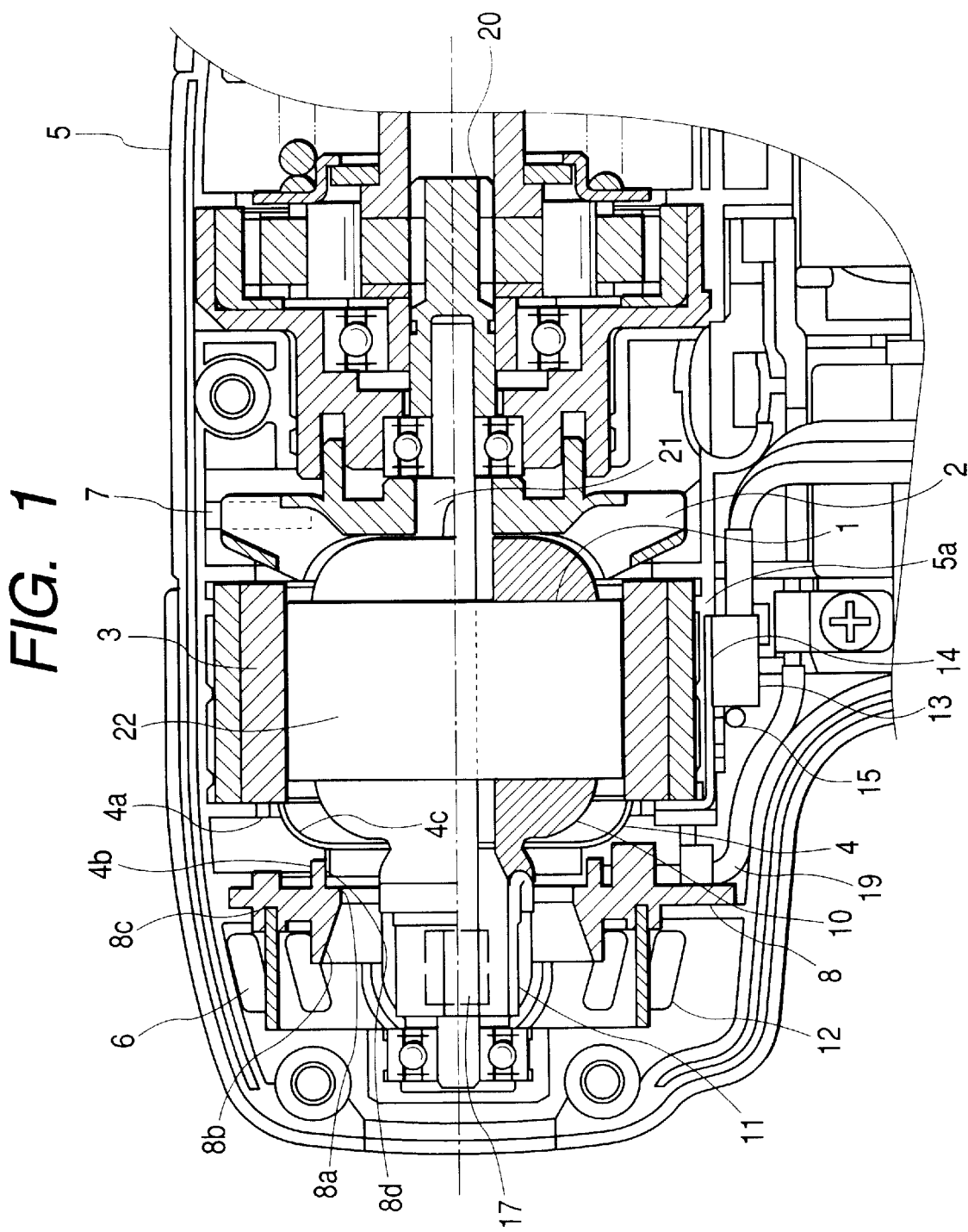
FIG. 1 is a side view in longitudinal section partly omitted showing a surrounding area of a motor in a motor-driven tool according to the invention.
Figure 2:
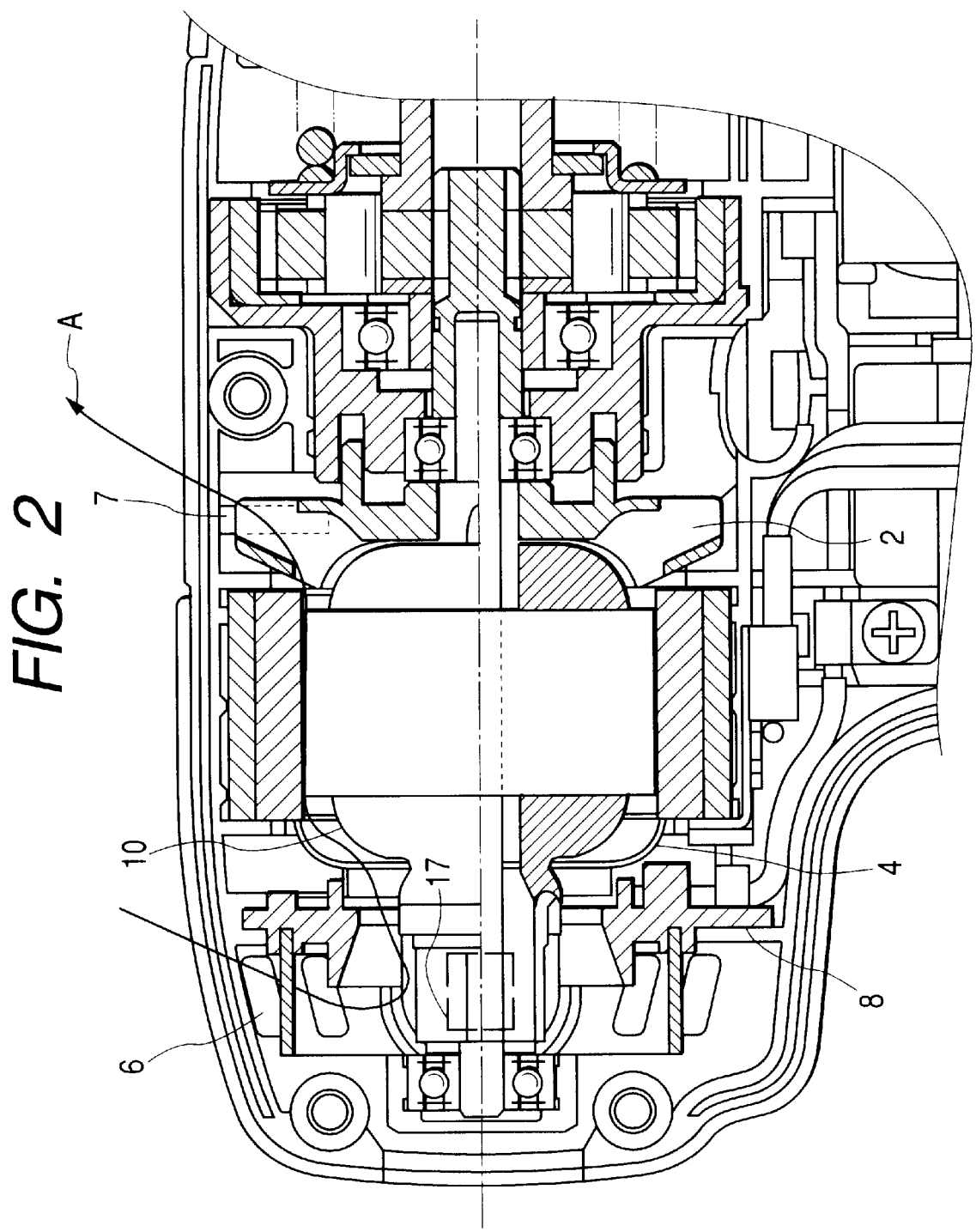
FIG. 2 is a side view in longitudinal section partly omitted showing an air passage in the surrounding area of the motor in the motor-driven tool according to the invention.
Figure 3:
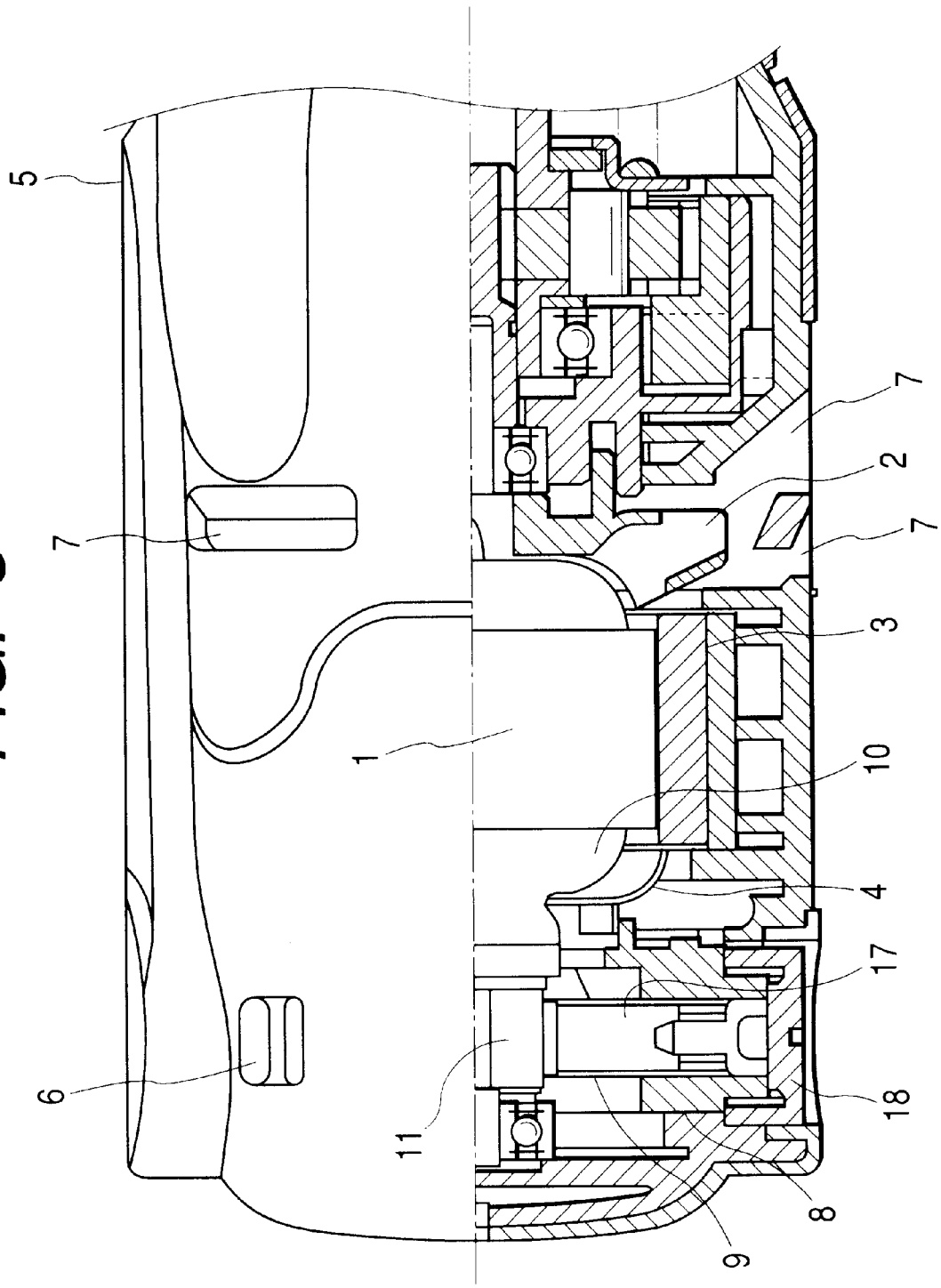
FIG. 3 is a plan view in longitudinal section partly omitted of FIGS. 1 and 2.
Figure 5B:
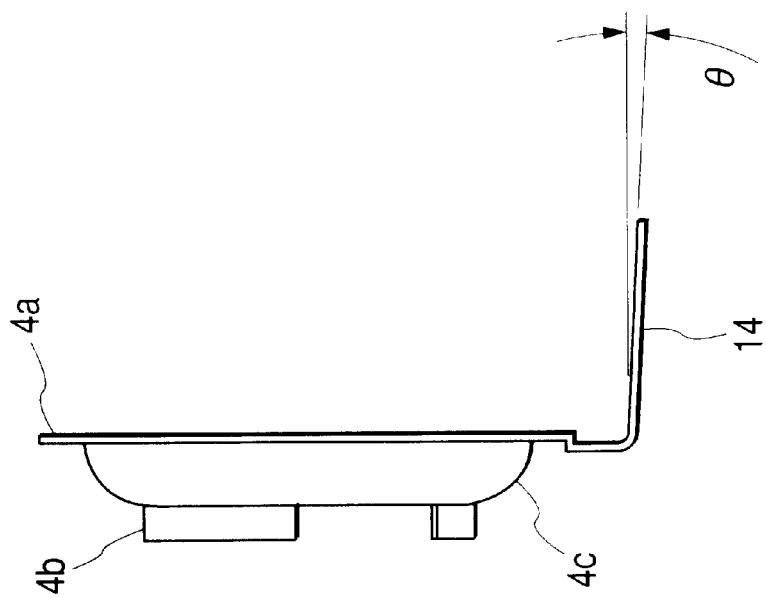
Figure 5A:
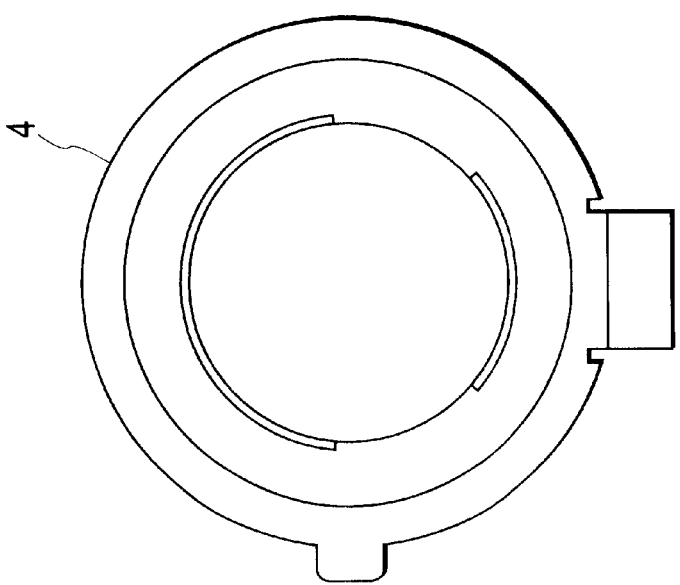
Figure 6:
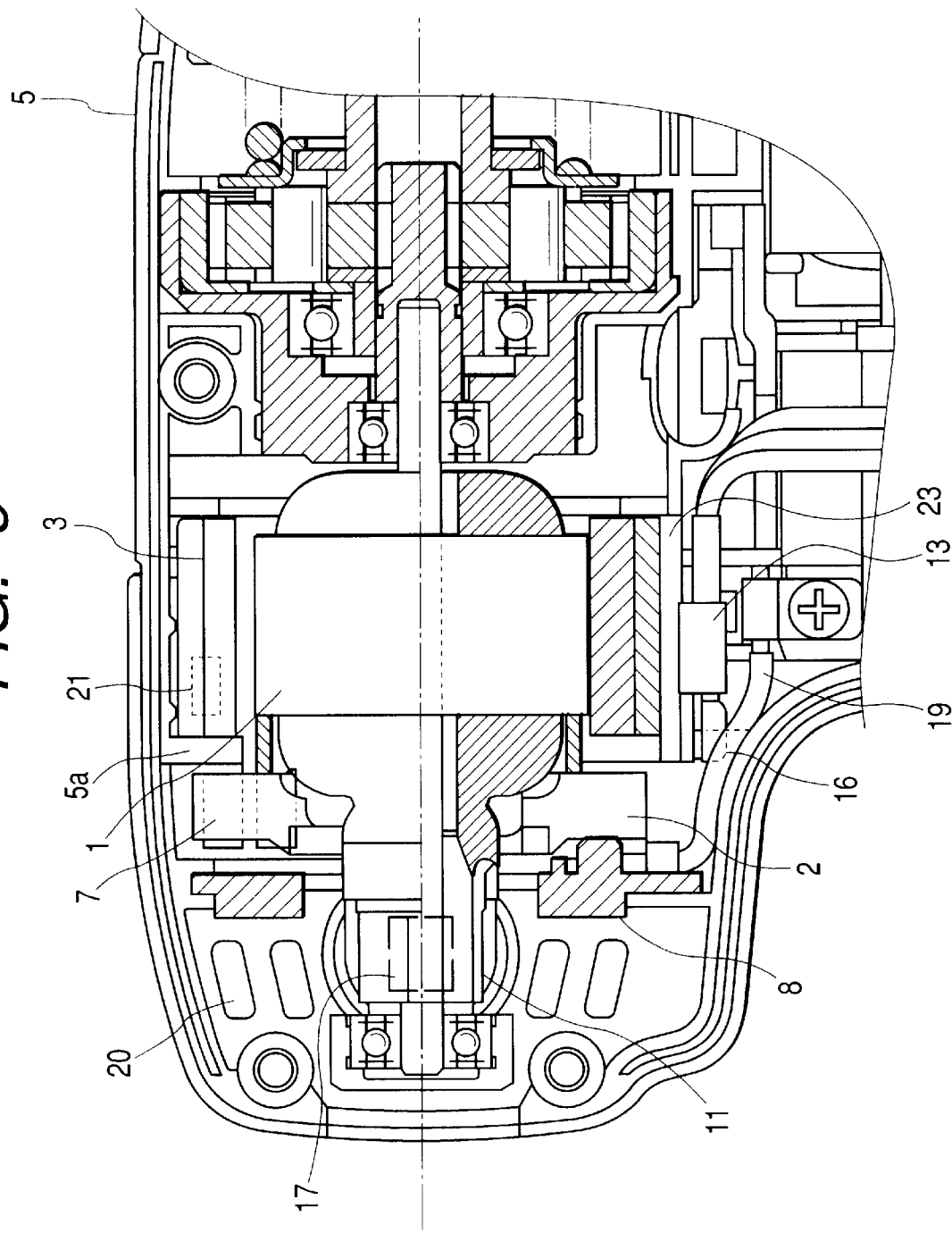
FIG. 6 is a side view in longitudinal section partly omitted showing a surrounding area of a motor in a conventional motor-driven tool.
Figure 7:
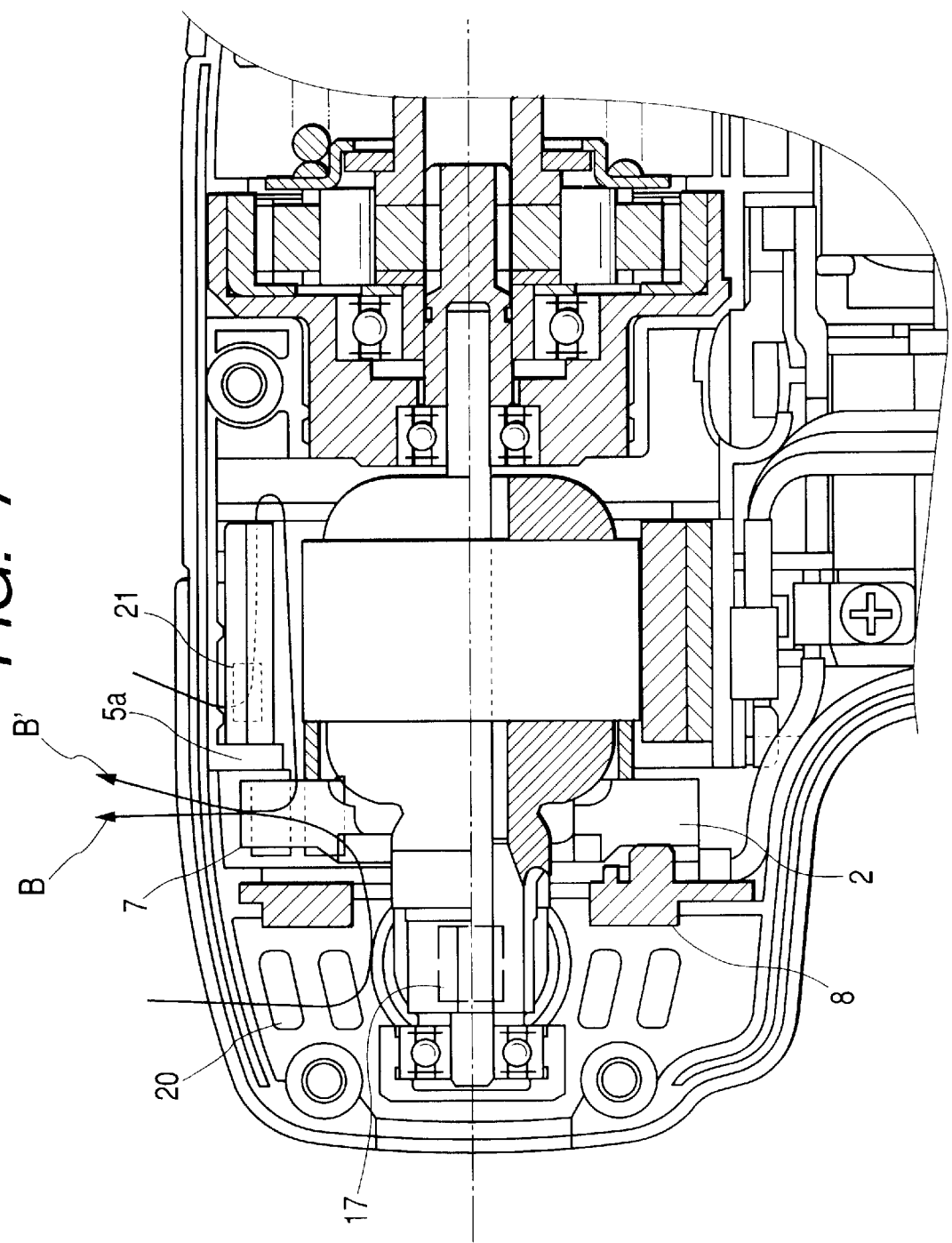
FIG. 7 is a side view in longitudinal section partly omitted showing an air passage in the surrounding area of the motor in the conventional motor-driven tool.
Figure 8:
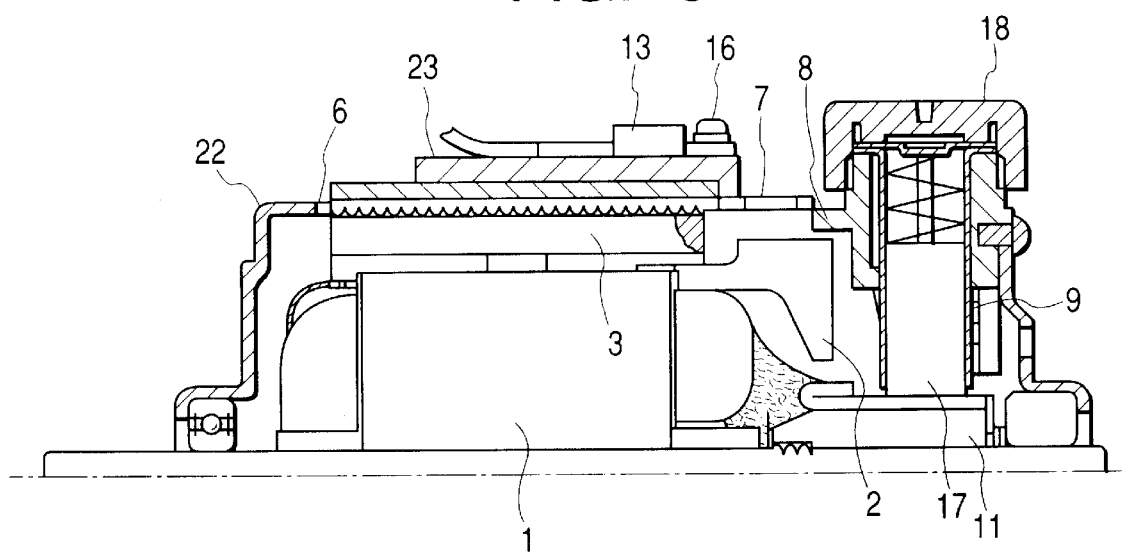
FIG. 8 is a side view in longitudinal section partly omitted showing a surrounding area of a motor in another conventional motor-driven tool.
Figure 9:
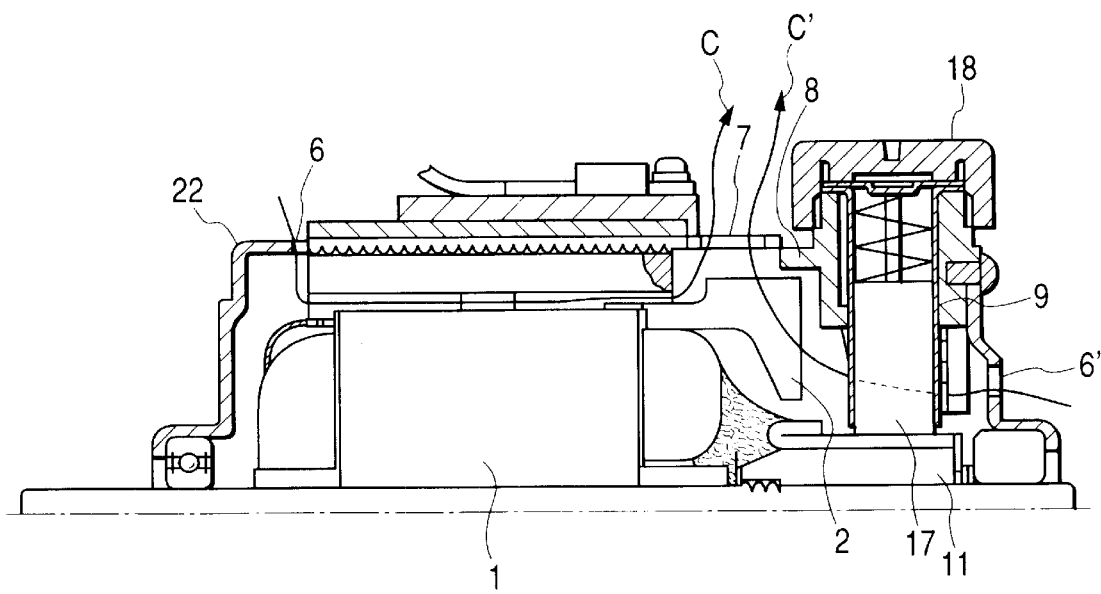
FIG. 9 is a side view in longitudinal section partly omitted showing an air passage in the surrounding area of the motor in the other conventional motor-driven tool.

A motor-driven tool in an embodiment of the invention will be described referring to FIGS. 1 to 5. FIGS. 1 and 2 are side views in longitudinal section partly omitted showing a surrounding area of a motor in a motor-driven tool in this embodiment. FIG. 3 is a plan view in longitudinal section partly omitted of FIGS. 1 and 2. FIGS. 4A to 4C show a carbon block 8 constituting a carbon brush part in this embodiment, in which FIG. 4A is a front view, FIG. 4B is a side view, and FIG. 4C is a back view of the same. FIGS. 5A and 5B show a heat radiating plate 4 in this embodiment, in which FIG. 5A is a front view and FIG. 5B is a side view of the same.

In FIGS. 1 to 3, an armature 1 having a pinion 20 is contained inside a housing 5 divided in two (hereinafter referred to as "a housing") in such a state that both ends of the armature are rotatably held by means of bearings. A stator 3 consisting of two pole magnets attached to an iron ring in a cylindrical shape is arranged outside a core 22 of this armature 1. Between the core 22 of the above mentioned armature 1 and the pinion 20, there is provided a centrifugal fan 2 which is fixed to a shaft 21, and in a part of the housing 5 located outside the centrifugal fan 2, there is provided a discharge port 7. On an outer periphery of a coil end 10 which is located between a commutator 11 and the core 22, there is provided a heat radiating plate 4 made of metal, keeping an appropriate distance from the coil end 10. This heat radiating plate 4 has a tubular portion 4c which is formed of an iron plate having a thickness of about 0.5 mm into a cup-like shape by drawing process, as shown in FIGS. 5A and 5B. One end 4a of the tubular portion 4c is attracted by the magnet of the stator 3 to be held thereon, and the other end 4b is engaged with a hole 8d of the carbon block 8. The carbon block 8 includes therein a circular wall 8a having a certain distance of about 6 to 8 mm from the commutator 11, and the circular wall 8a is provided with a tapered portion 8b which grows wider in cross section toward the commutator 11 and grows narrower toward the coil end 10. Further, the carbon block 8 is provided with a groove 8c for clamping a filter 12 on its outer circumference. The housing 5 is provided with a suction port 6 in an area outside the carbon block 8 located at a side of the commutator 11. The filter 12 is arranged between the suction port 6 and the tapered portion 8b of the carbon block 8.

Although the carbon brush 17 and the carbon tube 9 for holding this carbon brush 17 are arranged more close to the suction port 6 than to the tapered hole, an end of the tapered hole is extended up to a midway of the carbon brush 17. Meanwhile, the heat radiating plate 4 has a plate portion 14 having elasticity and extending in a tongue-like shape as shown in FIGS. 5A and 5B. The tongue-like portion is inclined at a few degree (θ) from 90°. A transmission switch for controlling number of rotation includes an electronic component (an FET) 13 which is a heat source. This electronic component 13 is provided between a rib 5a and an elastic rib 15 in a cylindrical shape having a small diameter in the housing 5, so as to clamp the plate portion 14.

Cooling effects of the motor-driven tool in this embodiment will be described below. As shown by an arrow A in FIG. 2, in order to increase velocity of the flow of the cooling air from the suction port 6, the carbon block 8 is provided with the circular wall having a narrow opening of about 8 mm from an outer periphery of the commutator 11, thus allowing the cooling air to circulate while increasing the velocity of the flow in the narrow space, thereby blowing the cooling air having the increased velocity onto the carbon brush 17 and the carbon tube 9. The cooling air having the increased velocity is blown through center holes of the carbon block 8 and the heat radiating plate 4 onto the coil end 10 of the armature which generates high heat. In this manner, rise of temperature in the carbon brush 17 and the coil end 10 of the armature which are the heat sources can be effectively prevented.

By providing the inner periphery of the carbon block 8 with the tapered portion of a flared cup-like shape which grows wider toward the suction port 6, and at the same time, by forming a shape of the heat radiating plate 4 following a contour of the coil end 10 of the armature, the cooling air can be smoothly flowed while decreasing a pressure loss due to a sudden change of a sectional area, and thus, a decrease of an amount of the air can be prevented. Moreover, by engaging the heat radiating plate 4 with the carbon block 8, the cooling air can be guided without dispersion, and continuously passed and blown up to the coil end 10 of the armature which is the heat source, thereby enabling the cooling efficiency to be enhanced. Another advantage of engaging the heat radiating plate 4 with the carbon block 8 is an improvement of assembling workability. For reference, because the stator 3 and the carbon block 8 have been separated in the conventional art, three components should have been assembled at the same time while aligning axes of the three components at a time (This is a considerably difficult work, because the armature 1 is under attraction by a magnetic force of the stator 3), and there has been such a case that the carbon tube 9 attached to the carbon block 8 might have damaged the commutator 11 which has been mounted to the armature 1.

The heat radiating plate 4 effectively cools down the stator 3 which is heated up by a radiant heat from the armature 1. When iron dust has intruded along with the cooling air, the iron dust strikes the coil end 10 of the armature and is then blown off in a circumferential direction. By utilizing this phenomenon, the iron dust is allowed to be attracted to the heat radiating plate by the magnetic force of the stator 3, so that an amount of the iron dust intruding between the armature 1 and the stator 3 may be reduced, thereby to minimize breakdowns. Another countermeasure for dust particles is to attach a net-like filter 12 to an outer periphery of the wall of the carbon block 8 so as to block an intrusion of a relatively large foreign particle such as a staple, near the suction port 6 of the housing 5. This will prevent foreign substances from entering between the carbon brush 17 and the commutator 11, and stable operation of the motor can be attained. It is also possible to enhance heat radiation property, by employing material having high thermal conductivity such as aluminum, as the material for the heat radiating plate 4. In addition to the above described, the heat radiating plate 4 cools the electronic component 13. In the conventional art, for reference, in order to cool the electronic component 13 such as the FET of the transmission switch, there has been provided, outside the casing 22 of the motor, a heat sink 23 made of aluminum, to which the electronic component 13 has been fixed by a screw 16. However, in the invention, the heat radiating plate 4 creates an air passage of the cooling air for the motor, attaining high cooling efficiency, and therefore, cooling effect for the electronic component 13 attached thereto is also very high.

In order to stabilize the cooling of the electronic component 13 against vibrations of the motor-driven tool while using, the motor-driven tool is constructed so that a tight contact between the heat radiating plate 4 and the electronic component 13 may be improved. The plate portion 14 of the heat radiating plate 4 is bent at a certain angle and imparted with springy property, and the housing 5 is provided with the rib 15 in a columnar shape (it may be of any shape provided that the rib is deformable) having a small diameter which is also imparted with springy property as well as the heat radiating plate 4, thereby to clamp the plate portion 14. Because the electronic component 13 is pressed from both sides with spring force of the plate portion 14 of the heat radiating plate 4 and spring force of the smaller diametered columnar rib 15 of the housing 5, the heat radiating plate 4 and the electronic component 13 can follow the vibrations of the motor-driven tool when used, to be brought into tight contact with each other, and the electronic component 13 can be cooled in a stabilized state. In this manner, there will be no need of providing the screw 16 and forming a screw hole in the heat sink, and therefore, the tool can be manufactured at a low cost. A still another advantage is that when the electronic component 13 is assembled between the heat radiating plate 4 and the housing 5, the assembling work will be easy, because the plate portion 14 of the heat radiating plate 4 and the smaller diametered columnar rib 15 of the housing 5 can be deformed outwardly.

According to the invention, by providing the wall along a circumference keeping a certain space from the outer periphery of the commutator between the suction port and the carbon brush, the cooling air is guided along the wall, increasing the velocity of the flow in the narrow space, and rise of the temperature of the carbon brush and the coil end of the armature which are the heat sources can be effectively restrained.

By providing the tapered portion on the inner face of the wall of the carbon block, and at the same time, by allowing the heat radiating plate to have such a shape as following the contour of the coil end of the armature, a pressure loss due to a sudden change in the sectional area can be reduced, and the cooling air can smoothly flow. Accordingly, a decrease of the amount of the air can be prevented.

Further, by engaging the heat radiating plate with the carbon block, the cooling air can be guided without dispersion, and continuously passed and blown up to the coil end of the armature which is the heat source, thereby enhancing the cooling efficiency. Further, by engaging the heat radiating plate with the carbon block, the heat radiating plate and the carbon block will become one assembly of the components, thus attaining an improvement of the assembling workability.

Further, by attaching the net-like filter to the carbon block, an intrusion of a relatively large foreign particle such as a staple near the suction port of the housing can be blocked, and a stable operation of the motor can be attained.

Moreover, because the heat radiating plate is provided with a mounting part for the electronic component to cool the electronic component, the heat radiating plate creates an air passage, attaining high cooling efficiency, and therefore, the electronic component can be effectively cooled. Still further, the plate portion of the heat radiating plate is bent at a certain angle, and the housing 5 is provided with the columnar rib imparted with springy property thereby to clamp the electronic component between the plate portion and the columnar rib of the housing. With this arrangement, the heat radiating plate and the electronic component can follow the vibrations of the motor-driven tool when used, to be brought into tight contact with each other, and the electronic component can be cooled in a stabilized state.

What is claimed is:

1. A motor-driven tool comprising:
   a motor including an armature and a stator;
   a cooling fan provided on a rotary shaft of said motor;
   a carbon brush part adapted to be cooled by said cooling fan; and
   a housing for containing said carbon brush part and said motor, said housing being provided with a suction port arid a discharge port;
   wherein said carbon brush part includes a cylindrical side wall between said suction port and a commutator of said motor, said cylindrical side wall located close to an outer periphery of said commutator being provided with a tapered portion which extends along a majority of the inner face of said cylindrical side wall and which grows wider toward said commutator and grows narrower toward a coil end of said armature, and wherein a heat radiating plate made of metal engages said carbon brush part and is provided between said carbon brush part and said coil end.

2. A motor-driven tool as claimed in claim 1, wherein air passages are formed between said carbon brush part and said heat radiating plate, and between said heat radiating plate and said armature, and wherein said heat radiating plate has a shape following a contour of said coil end of said armature.

3. A motor-driven tool as claimed in claim 1, wherein said heat radiating plate attracted to said stator by a magnetic force includes an engaging portion with respect to said carbon brush part, and an elastic plate portion having an angle θ.

4. A motor-driven tool as claimed in claim 3, wherein an electronic component is provided between said plate portion and an elastic rib in a columnar shape provided in said housing.

5. A motor-driven tool as claimed in claim 1, wherein said carbon brush part includes a net-like filter.

6. The tool of claim 5, wherein said filter is arranged between said suction port and said tapered portion.

7. The tool of claim 1, wherein said cooling fan is provided between a core and a pinion of said armature.

8. The tool of claim 1, wherein said heat radiating plate comprises a tubular portion.

9. The tool of claim 8, wherein said tubular portion comprises an iron plate.

10. The tool of claim 8, wherein said tubular portion forms a cup-like shape.

11. The tool of claim 1, wherein said carbon brush part comprises a groove for receiving a filter.

12. The tool of claim 1, wherein said suction port is positioned outside said carbon brush part and at a side of said commutator.

13. The tool of claim 1, wherein an end of said tapered portion extends to a midpoint of a carbon brush of said carbon brush part.

14. The tool of claim 1, wherein said tapered portion comprises a flared cup-like shape.

15. A motor-driven tool comprising:
- a motor including an armature and a stator;
- a fan provided on a shaft of said motor;
- a housing containing said motor, wherein said housing comprises a suction port and a discharge port; and
- a carbon brush block contained by said housing and comprising a cylindrical side wall between said suction port and a commutator of said motor, wherein a majority of an inner face of said cylindrical side wall tapers from a wide end toward said commutator and to a narrow end toward a coil end of said armature.

16. A motor-driven tool comprising:
- a motor including an armature and a stator;
- a fan provided on a shaft of said motor;
- a housing containing said motor, wherein said housing comprises a suction port and a discharge port;
- a carbon brush block contained in said housing; and
- a metal heat radiating plate engaging said carbon brush part and having a shape that follows a contour of a coil end of said armature.

* * * * *